United States Patent
Lin

(10) Patent No.: US 8,337,343 B2
(45) Date of Patent: Dec. 25, 2012

(54) FRONT DERAILLEUR OF BICYCLE

(76) Inventor: Chang Hui Lin, Changhu (TW)

(*) Notice: Subject to any disclaimer, the term of this patent is extended or adjusted under 35 U.S.C. 154(b) by 424 days.

(21) Appl. No.: 12/718,965

(22) Filed: Mar. 6, 2010

(65) Prior Publication Data

US 2011/0218067 A1   Sep. 8, 2011

(51) Int. Cl.
- F16H 9/00   (2006.01)
- F16H 59/00   (2006.01)
- F16H 61/00   (2006.01)
- F16H 63/00   (2006.01)

(52) U.S. Cl. ............................... 474/82; 474/78; 474/80

(58) Field of Classification Search ............. 474/78, 474/80, 82
See application file for complete search history.

(56) References Cited

U.S. PATENT DOCUMENTS

| | | | | |
|---|---|---|---|---|
| 6,099,425 A * | 8/2000 | Kondo | | 474/82 |
| 6,234,927 B1 * | 5/2001 | Peng | | 474/82 |
| 6,270,124 B1 * | 8/2001 | Nanko | | 285/15 |
| 6,277,044 B1 * | 8/2001 | Fujimoto | | 474/80 |
| 6,482,115 B2 * | 11/2002 | Takachi | | 474/80 |
| 6,491,597 B2 * | 12/2002 | Chen | | 474/82 |
| 6,629,903 B1 * | 10/2003 | Kondo | | 474/82 |
| 6,695,729 B2 * | 2/2004 | Ozaki | | 474/80 |
| 7,014,584 B2 * | 3/2006 | Nanko et al. | | 474/80 |
| 7,189,173 B2 * | 3/2007 | Tsai et al. | | 474/82 |
| 7,704,173 B2 * | 4/2010 | Ichida et al. | | 474/82 |
| 7,722,486 B2 * | 5/2010 | Nanko | | 474/80 |
| 7,914,407 B2 * | 3/2011 | Fukushima et al. | | 474/82 |
| 2002/0165054 A1 * | 11/2002 | Chen | | 474/82 |
| 2003/0083161 A1 * | 5/2003 | Ozaki | | 474/80 |
| 2004/0005951 A1 * | 1/2004 | Tsai et al. | | 474/80 |
| 2004/0166973 A1 * | 8/2004 | Nanko | | 474/80 |
| 2006/0148602 A1 * | 7/2006 | Iwasaki | | 474/78 |
| 2006/0189421 A1 * | 8/2006 | Ichida et al. | | 474/80 |
| 2006/0189422 A1 * | 8/2006 | Ichida et al. | | 474/80 |
| 2007/0037645 A1 * | 2/2007 | Ishikawa | | 474/80 |
| 2007/0135249 A1 * | 6/2007 | Nanko | | 474/80 |
| 2007/0191158 A1 * | 8/2007 | Ichida et al. | | 474/80 |
| 2007/0298920 A1 * | 12/2007 | Nakai et al. | | 474/80 |
| 2008/0004142 A1 * | 1/2008 | Nakai et al. | | 474/80 |
| 2008/0300076 A1 * | 12/2008 | Fukushima et al. | | 474/80 |

* cited by examiner

Primary Examiner — Michael Mansen
Assistant Examiner — Henry Liu

(57) ABSTRACT

A front derailleur of a bicycle comprises a retaining ring disposed on a bottom end of a seat post, the retaining ring including two coupling seats symmetrically fixed thereon to axially connect with a pushing mechanism comprised of a cable rack, a limiting stem, a connecting rod set, a guiding loop, an axial pillar, an assembling bracket, and a guide plate, the coupling seat including the connecting rod set having a first, a second, a third, and a fourth connecting rods, a shaft, and the guiding loop, wherein the coupling seat includes a first hole formed on a bottom end of a side thereof so that a first screw inserts through a first bore of the cable rack and a turning spring to screw with the first hole of the coupling seat, and includes two first tabs mounted on top ends thereof respectively to connected with the axial pillar axially.

7 Claims, 10 Drawing Sheets

200
FRONT DERAILLEUR OF BICYCLE

BACKGROUND OF THE INVENTION

1. Field of the Invention

The present invention relates to a front derailleur of a bicycle that can shift speed smoothly.

2. Description of the Prior Art

A conventional front derailleur of a bicycle is installed to a bottom end of a seat post to pull or release a speed shifting cable which is connected to the front derailleur so that a chain displaces horizontally between two or three chain wheels to shift speed. However, such a conventional front derailleur still has the following defects:

1. When shifting speed, a guide plate laterally pushes the chain so that a small chain wheel shifts to a large chain wheel adjacent to the small chain wheel, but the chain interferes with teeth to make noise or disengages from the teeth.

The present invention has arisen to mitigate and/or obviate the afore-described disadvantages.

SUMMARY OF THE INVENTION

The primary object of the present invention is to provide a front derailleur of a bicycle which is capable of overcoming the shortcomings of the conventional front derailleur of the bicycle thereof.

Further object of the present invention is to provide a front derailleur of a bicycle that can shift speed smoothly.

Another object of the present invention is to provide a front derailleur of a bicycle that can prevent the chain from interfering the teeth, prevent the chain from disengaging from the teeth, and prevent the chain from making noise because rubbing with the teeth.

A front derailleur of a bicycle in accordance with a preferred embodiment of the present invention comprises:

a retaining ring disposed on a bottom end of a seat post, the retaining ring including two coupling seats symmetrically fixed thereon to axially connect with a pushing mechanism, and the pushing mechanism being comprised of a cable rack, a limiting stem, a connecting rod set, a guiding loop, an axial pillar, an assembling bracket, and a guide plate, the coupling seat including the connecting rod set attached thereon, and the connecting rod set including a first connecting rod, a second connecting rod, a third connecting rod, and a fourth connecting rod, a shaft, and the guiding loop, characterized in that the coupling seat includes a first hole formed on a bottom end of a side thereof so that a first screw inserts through a first bore of the cable rack and a turning spring so that the cable rack and the turning spring screw with the first hole of the coupling seat by ways of the first screw, and includes two first tabs mounted on top ends thereof respectively to connected with the axial pillar axially.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
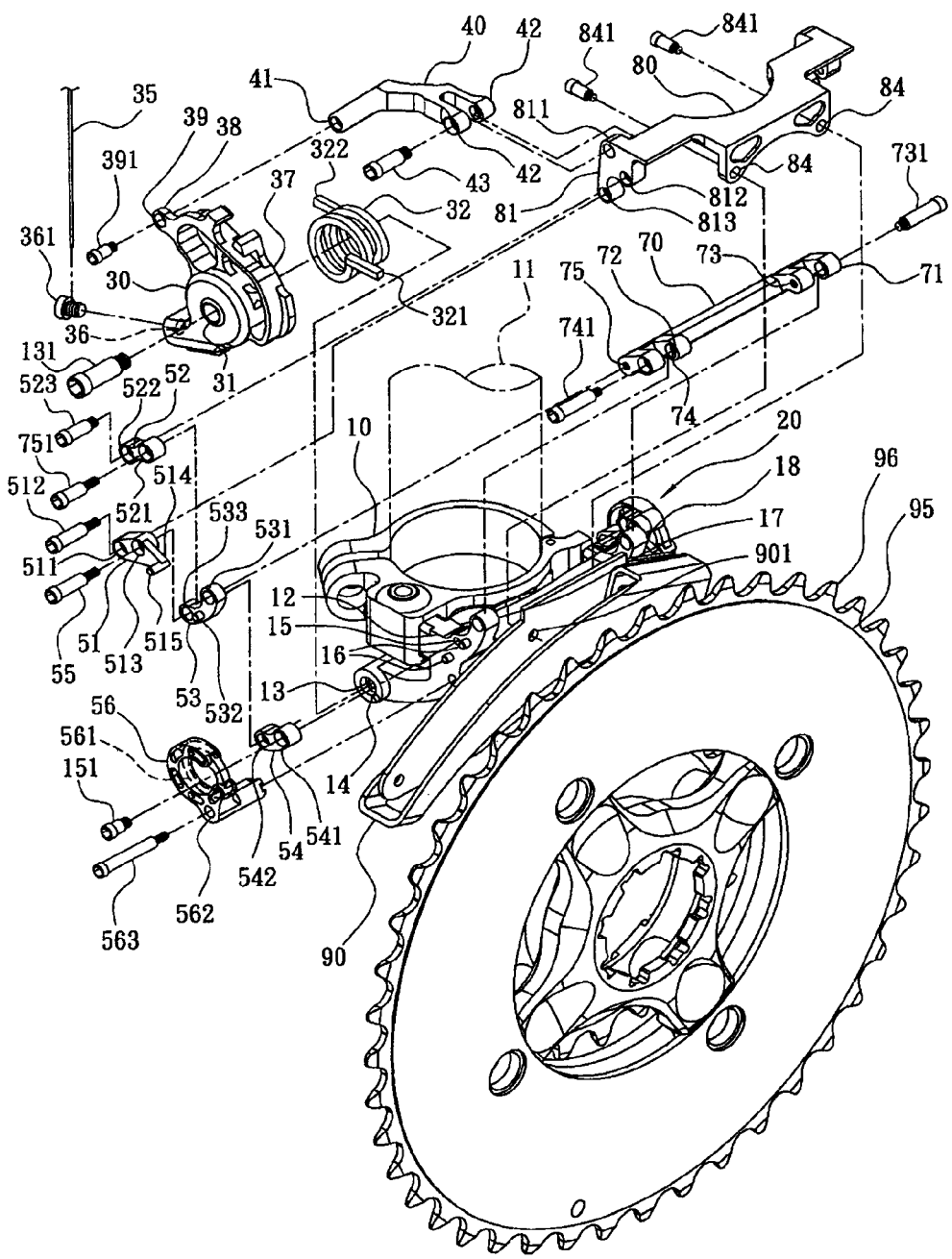
FIG. 1 is a perspective view showing the exploded components of a front derailleur of a bicycle according to a preferred embodiment of the present invention.
Figure 2:
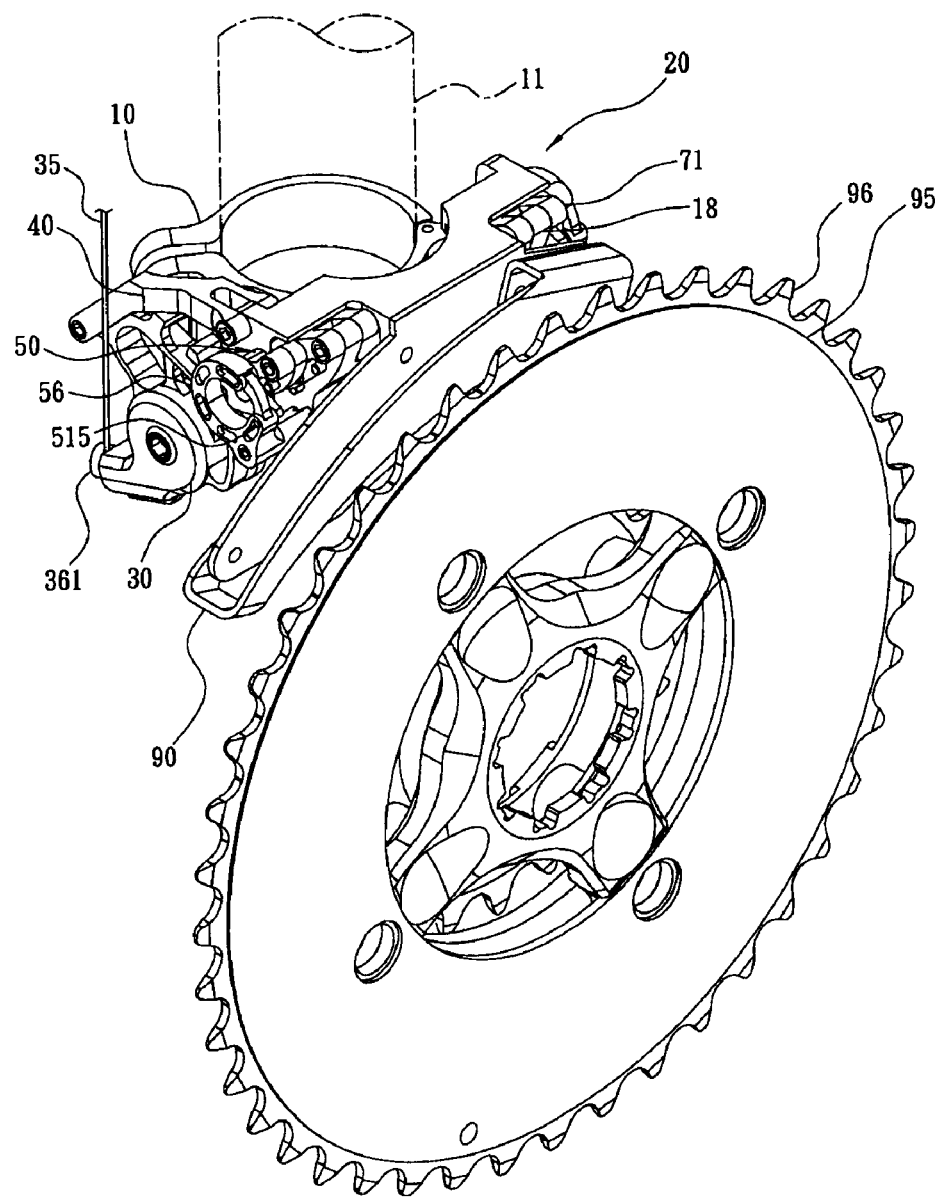
FIG. 2 is a perspective view showing the assembly of the front derailleur of the bicycle according to the preferred embodiment of the present invention.
Figure 3:
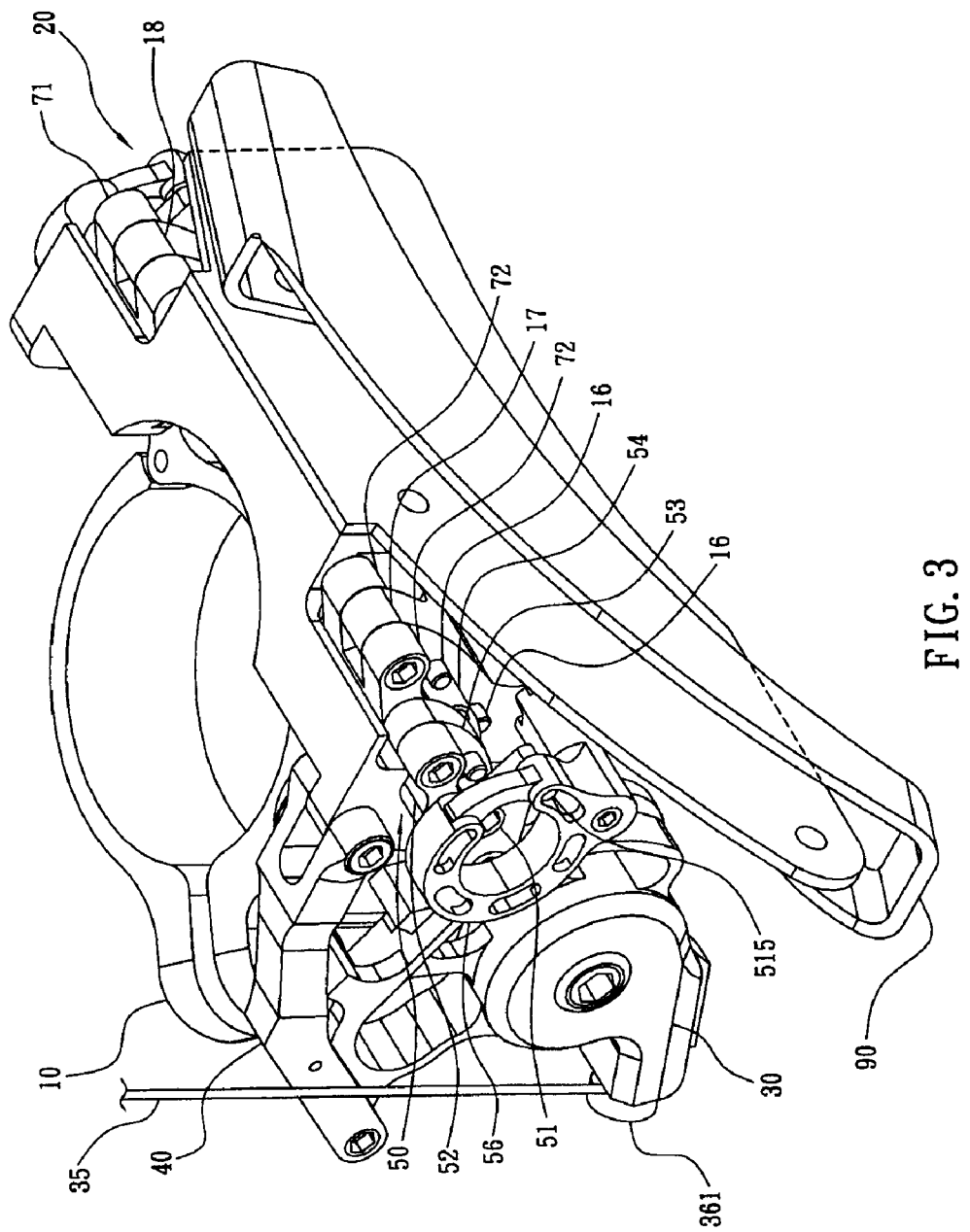
FIG. 3 is another perspective view showing the assembly of the front derailleur of the bicycle according to the preferred embodiment of the present invention.
Figure 4:
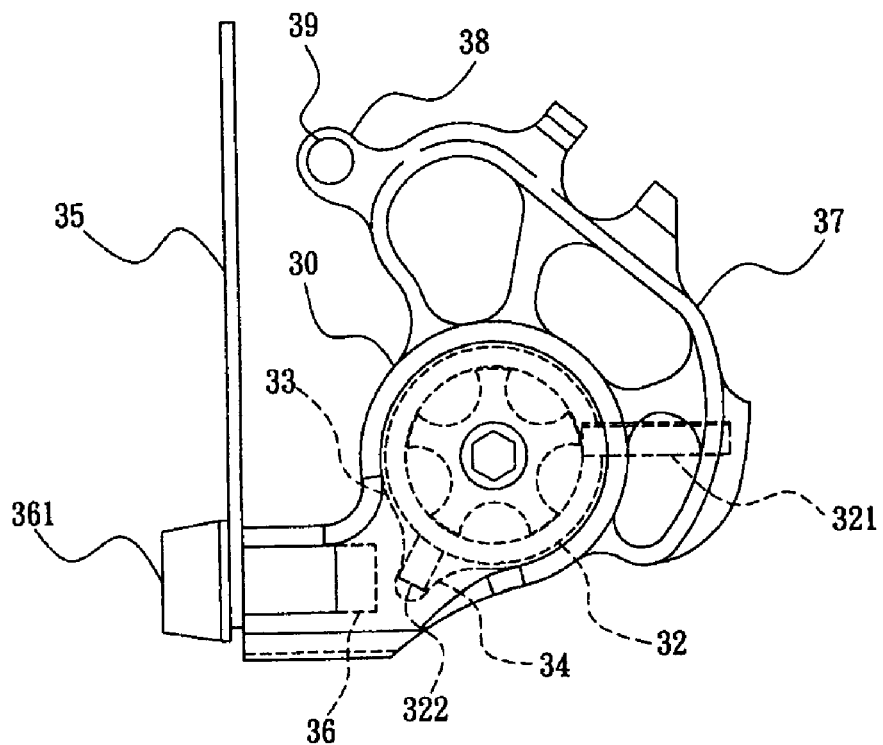
FIG. 4 is a plan view showing the operation of a cable rack of the front derailleur of the bicycle according to the preferred embodiment of the present invention.
Figure 5:
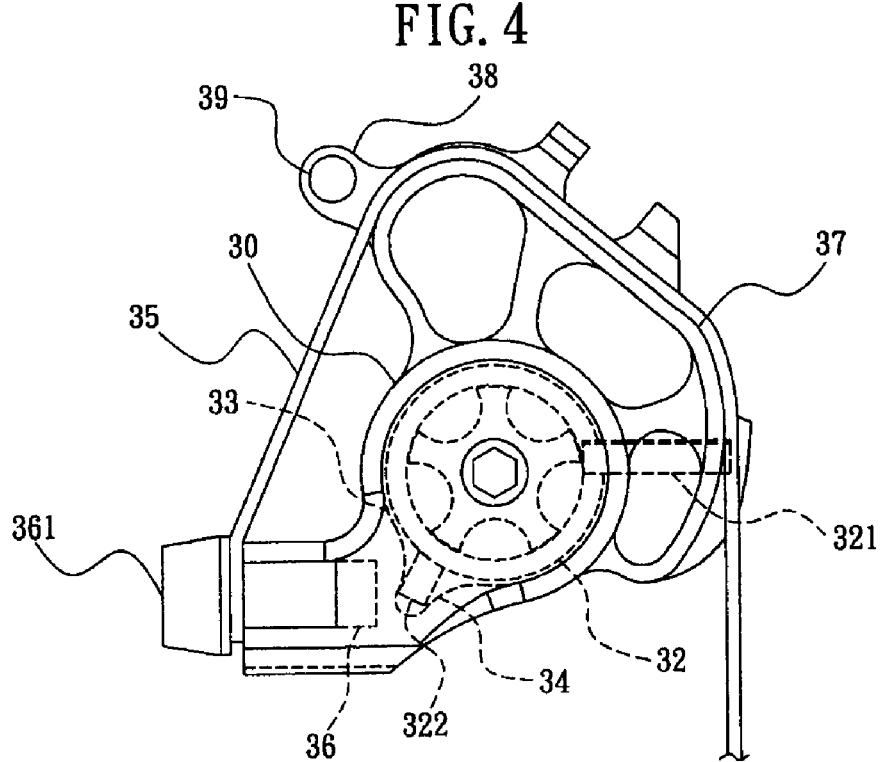
FIG. 5 is another plan view showing the operation of the cable rack of the front derailleur of the bicycle according to the preferred embodiment of the present invention.
Figure 6:
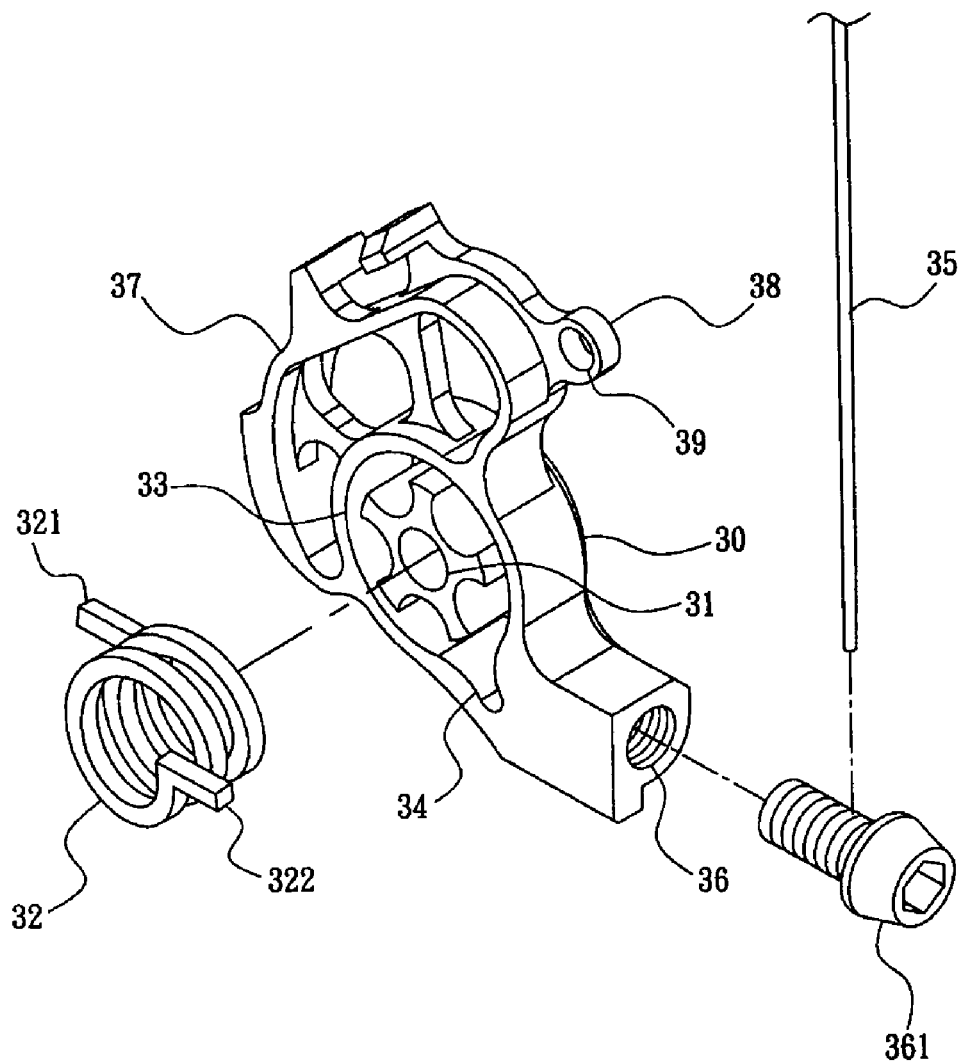
FIG. 6 is a perspective view showing the exploded components of the cable rack of the front derailleur of the bicycle according to the preferred embodiment of the present invention.
Figure 7:
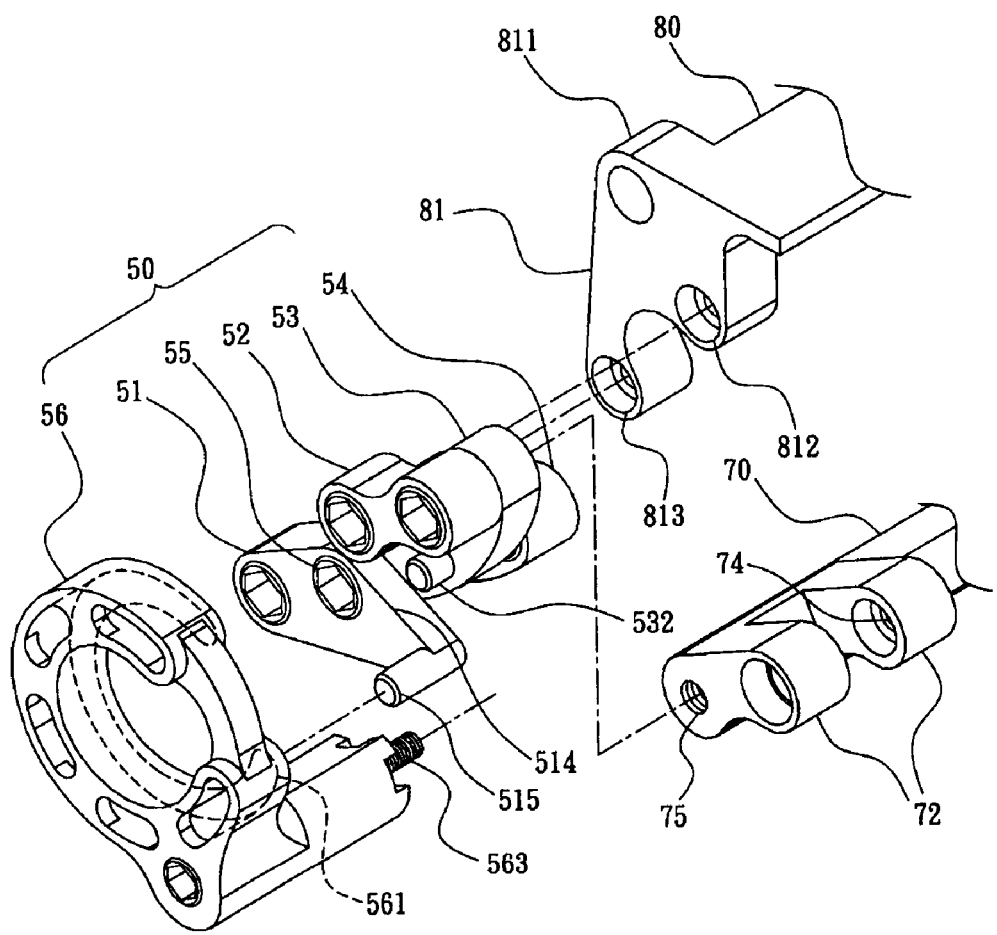
FIG. 7 is a perspective view showing the exploded components of a connecting rod set of the front derailleur of the bicycle according to the preferred embodiment of the present invention.
Figure 8:
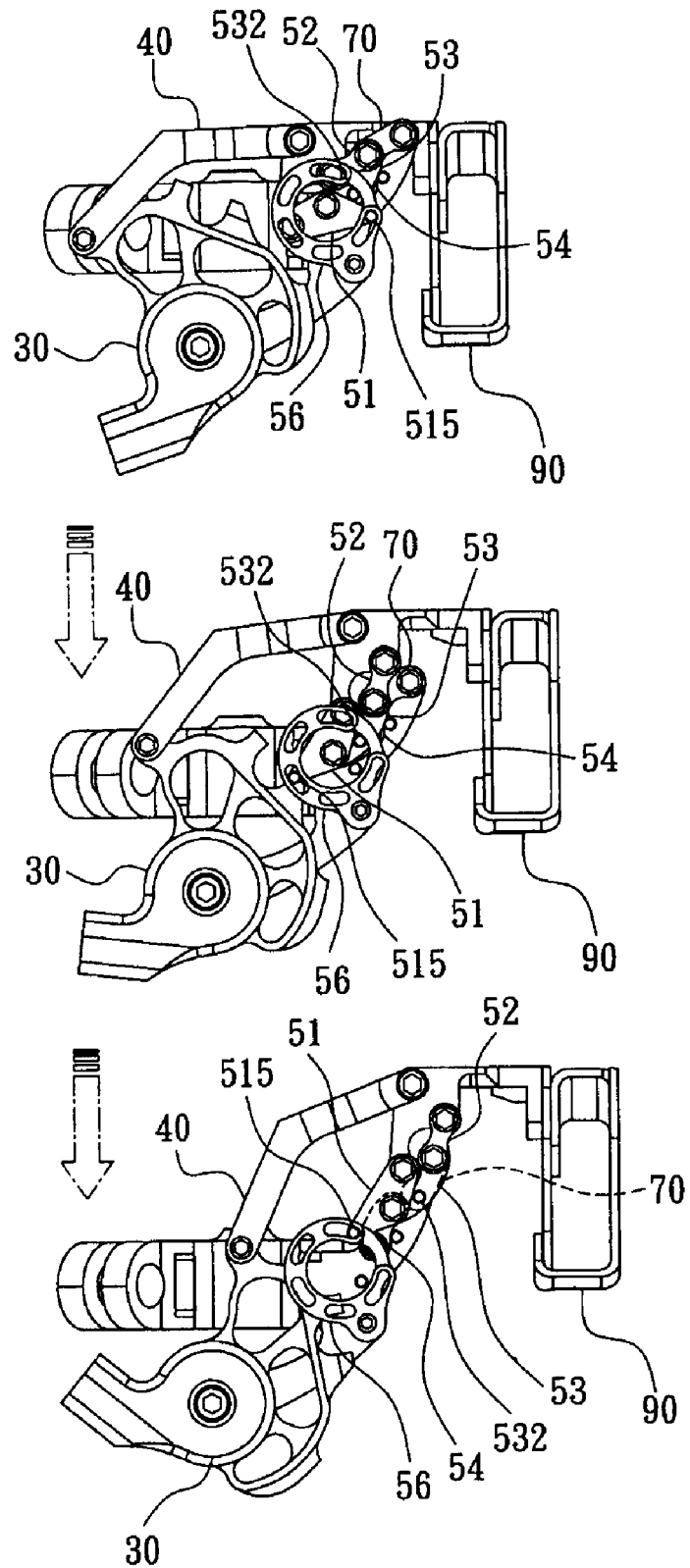
FIG. 8 is a plan view showing the operation of the front derailleur of the bicycle according to the preferred embodiment of the present invention.
Figure 9:
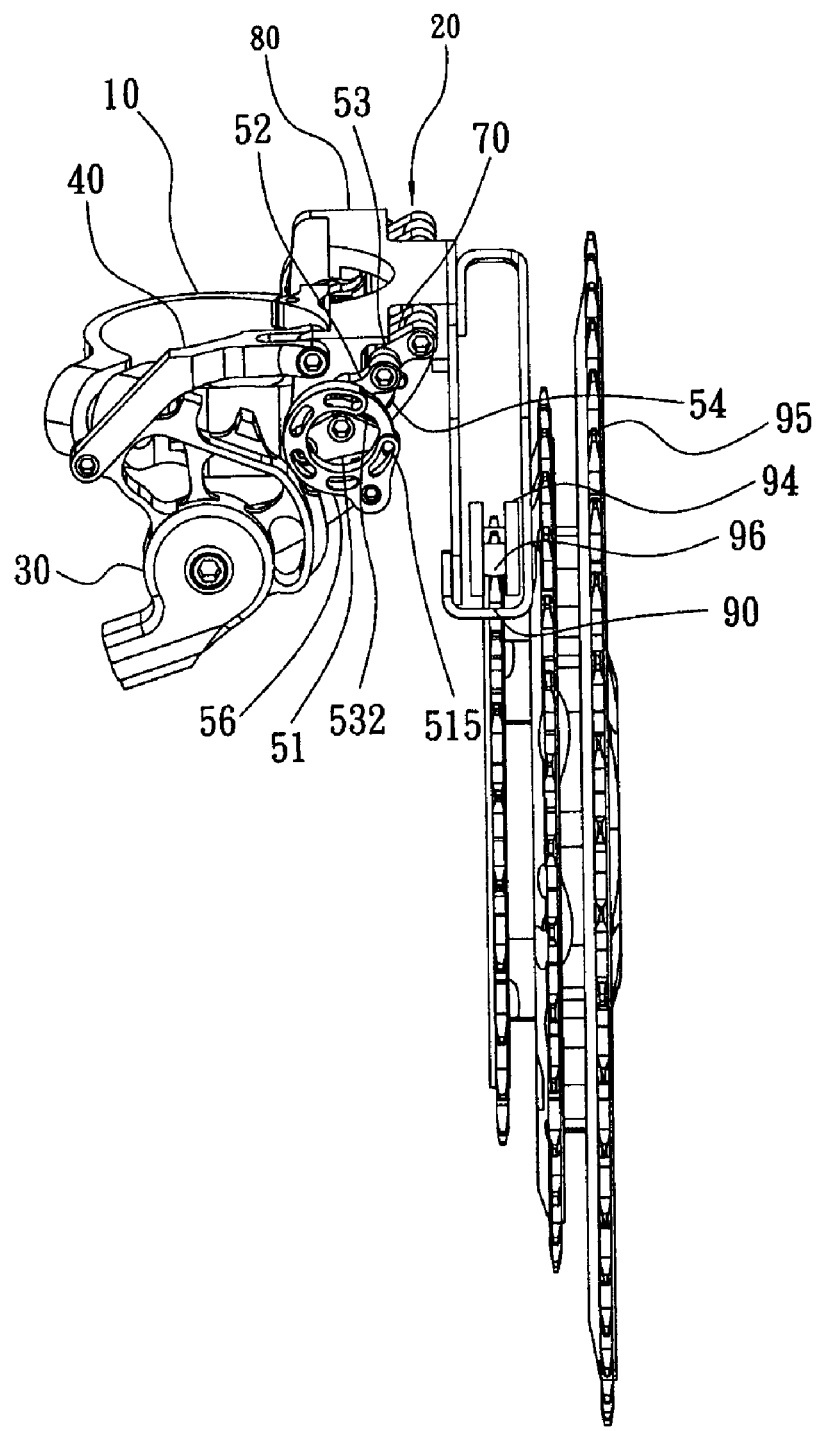
FIG. 9 is a perspective view showing the operation of a chain of the bicycle according to the preferred embodiment of the present invention.
Figure 10:
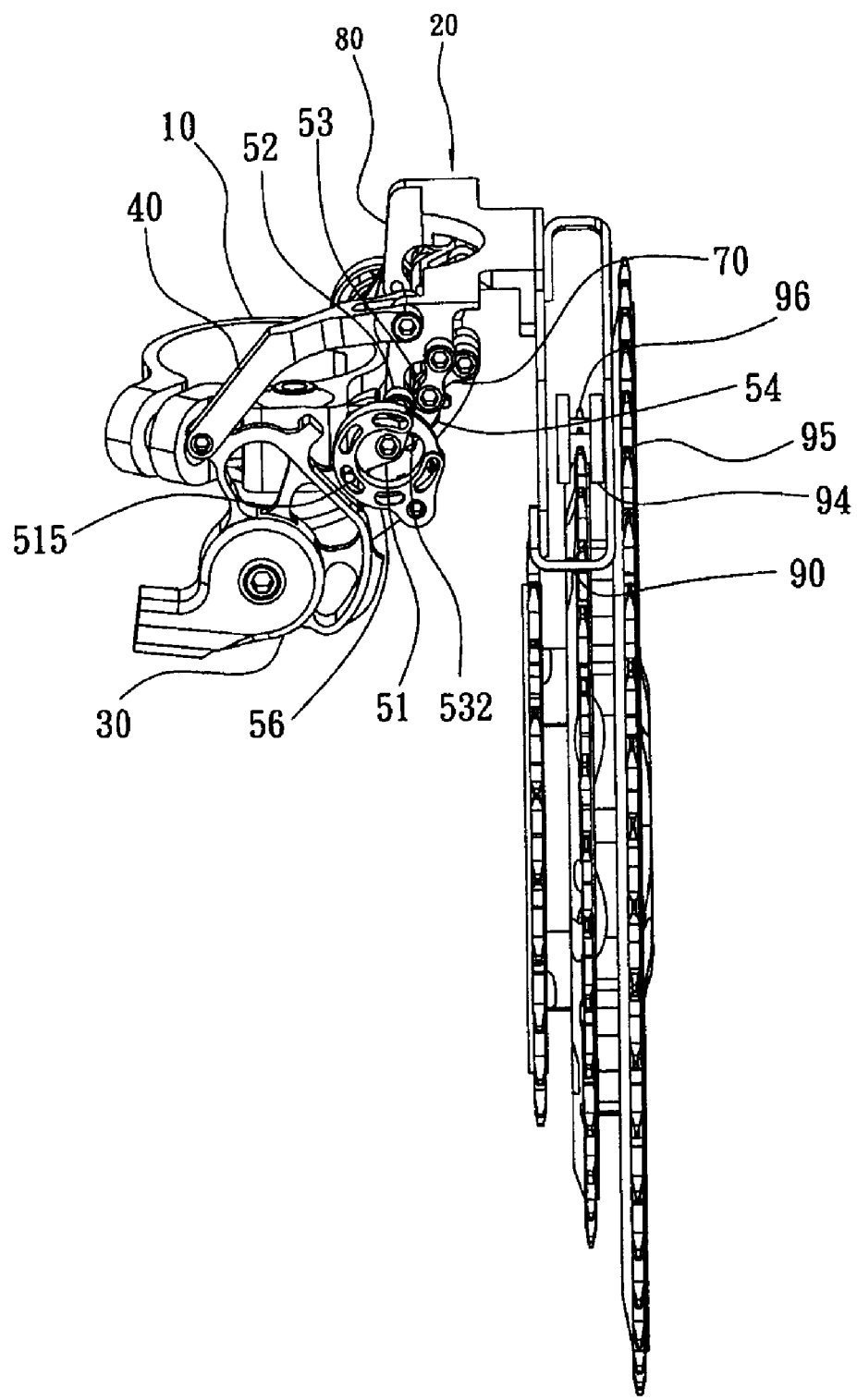
FIG. 10 is another perspective view showing the operation of the chain of the bicycle according to the preferred embodiment of the present invention.
Figure 11:
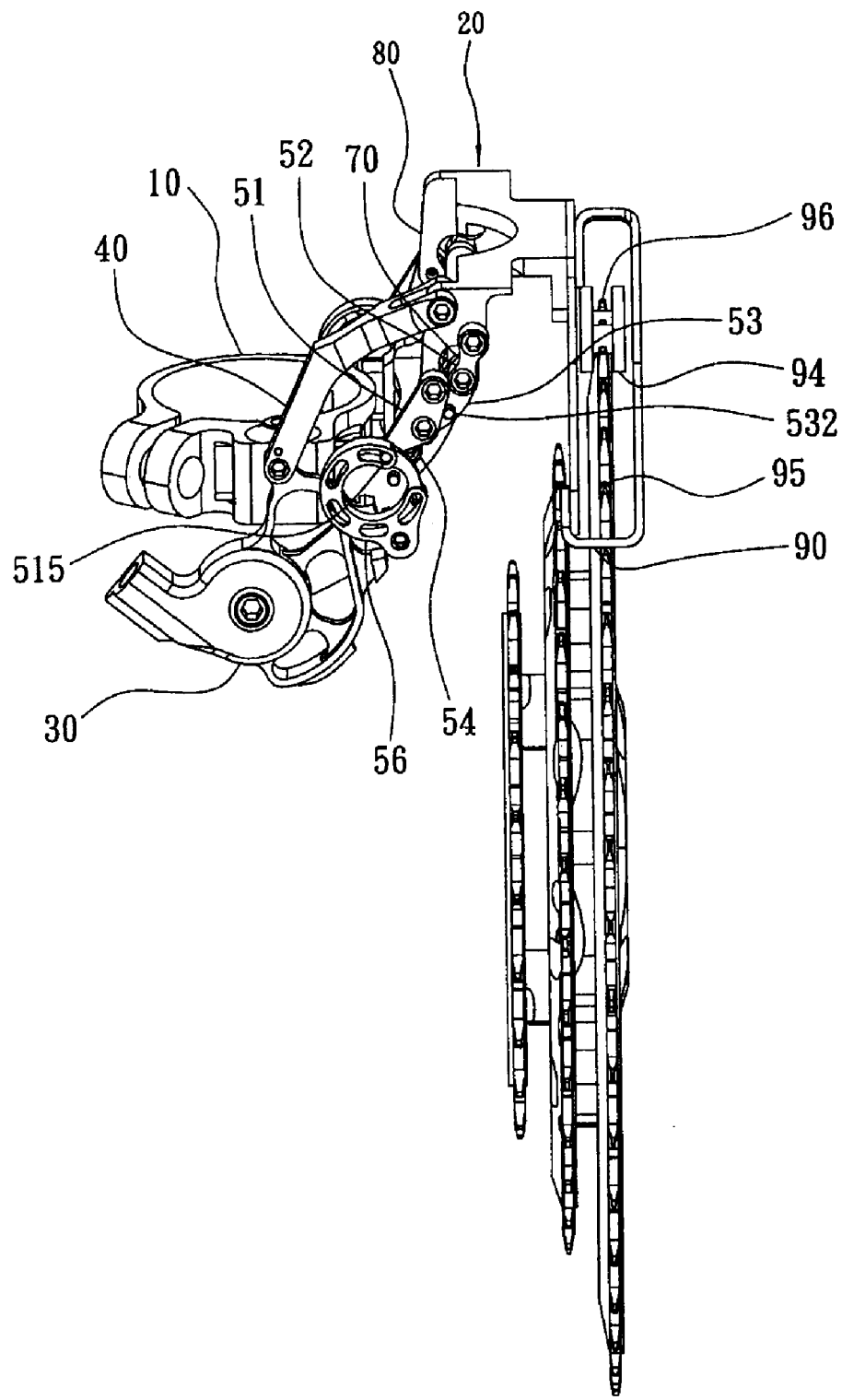
FIG. 11 is also another perspective view showing the operation of the chain of the bicycle according to the preferred embodiment of the present invention.

Referring to FIGS. 1-11, a front derailleur of a bicycle in accordance with a preferred embodiment of the present invention comprises a retaining ring 10 disposed on a bottom end of a seat post 11, the retaining ring 10 including two coupling seats 12 symmetrically fixed thereon to axially connect with a pushing mechanism 20, and the pushing mechanism 20 being comprised of a cable rack 30, a limiting stem 40, a connecting rod set 50, a guiding loop 56, an axial pillar 70, an assembling bracket 80, and a guide plate 90, the coupling seat 12 including the connecting rod set 50 attached thereon, and the connecting rod set 50 including a first connecting rod 51, a second connecting rod 52, a third connecting rod 53, and a fourth connecting rod 54, a shaft 55, and the guiding loop 56, and the coupling seat 12 including a first hole 13 formed on a bottom end of a side thereof so that a first screw 131 inserts through a first bore 31 of the cable rack 30 and a turning spring 32 so that the cable rack 30 and the turning spring 32 screw with the first hole 13 of the coupling seat 12, and the coupling seat 12 including a boss 14 extending thereon proximate to the first hole 13 to retain with a front segment 321 of the turning spring 32, including a second hole 15 disposed on a middle section between two sides thereof so that a second screw 151 inserts through a seventh aperture 541 of a front end of the fourth connecting rod 54 to screw with the second hole 15, the second hole 15 including two first defining pegs 16 extending from one side thereof to limit the fourth connecting rod 54 to move in a horizontally arcuate path when it is actuated, the coupling seats 12 including two first tabs 17, 18 mounted on top ends thereof respectively to connected with the axial pillar 70 axially, and the axial pillar 70 including a second and a third tabs 71, 72 attached on two sides thereof individually, and the second and the third tabs 71, 72 including a third and a fourth hole 73, 74 formed thereon individually to insert a ninth and a tenth screws 731, 741 to screw with the first tabs 17, 18 of the coupling seat 12 respectively, the axial pillar 70 including a fifth hole 75 fixed on a bottom end thereof so that an eleventh screw 751 inserts through a third aperture 521 of a front end of the second connecting rod 52 and a fifth aperture 531 of a front end of the third connecting rod 53 to screw with the fifth hole 75.

The cable rack 30 includes the first bore 31 disposed on a middle section thereof, a recess 33 and a groove 34 mounted on an inner wall thereof, and the recess 33 includes the returning spring 32 received therein so that the first screw 131 inserts through the first bore 31 and the turning spring 32 of the recess 33 to screw with the first hole 13 of the coupling seat 12, and the front segment 321 of the turning spring 32 retains with the boss 14 of the coupling seat 12. A distal segment 322 is retained in the groove 34 of the cable rack 30 so that when the returning spring 32 releases or pulls a speed shifting cable 35, the cable rack 30 rotates to a positioning or a returning position to shift speed, and the cable rack 30 includes an orifice 36 secured on a bottom end thereof to inert a third screw 361 to screw with the speed shifting cable 35, and the cable rack 30 includes a frame 37 disposed on an outer rim of a top end thereof to assemble the speed shifting cable 35, and the frame 37 includes a fourth tab 38 mounted on a left side thereof, the fourth tab 38 includes an opening 39 fixed thereon to insert a fourth screw 391 to axially limit the limiting stem 40, and the limiting stem 40 includes a vent 41 arranged on a distal side thereof, and includes a fifth tab 42 attached on a front side thereof so that a fifth screw 43 inserts through the fifth tab 42 to axially connect with a sixth tab 811 of a wing piece 81 of the assembling bracket 80, the assembling bracket 80 includes a holder 83 and a second bore 84 formed on a front end thereof so that a twelfth screw 841 inserts through the second bore 84 to screw with a sixth hole 901 of the guide plate 90, and includes the wing piece 81 disposed on a rear end thereof, the wing piece 81 includes the sixth tab 811 to axially fix the limiting stem 40, and a ninth and a tenth apertures 812, 813 to axially fix the first connecting rod 51 and the second connecting rod 52 of the connecting rod set 50 individually. The first connecting rod 51 of the connecting rod set 50 includes a first aperture 511 fixed on a rear end thereof to insert a sixth screw 512 to screw with the tenth aperture 813 of the wing piece 81 of the assembling bracket 80, and the first connecting rod 51 includes a second aperture 513 formed on a middle section thereof, and includes a retainer 514 and a shank 515 secured on a front end thereof.

The second connecting rod 52 includes a third aperture 521 disposed on a front end thereof so that an eleventh screw 751 inserts through the third aperture 521 and the fifth aperture 531 of the third connecting rod 53 to screw with the fifth hole 75 of the axial pillar 70, and includes a fourth aperture 522 disposed on a rear end thereof so that a seventh screw 523 inserts through the fourth aperture 522 to screw with the ninth aperture 812 of the wing piece 81 of the assembling bracket 80.

The third connecting rod 53 includes the fifth aperture 531 mounted on a front end thereof so that the eleventh screw 751 inserts through the third aperture 521 of the second connecting rod 52 and the fifth aperture 531 to screw with the fifth hole 75 of the axial pillar 70, and includes a second defining peg 532 fixed on a middle section thereof so that when the connecting rod set 50 does not expand or expands toward a largest distance to be positioned, the second defining peg 532 contacts with the retainer 514 of the first connecting rod 51 to limit the connecting rod set 50 expands to displace in a horizontally arcuate path, and includes a sixth aperture 533 arranged on a rear end thereof.

The fourth connecting rod 54 includes a seventh aperture 541 disposed on a front end thereof so that the second screw 151 inserts through the seventh aperture 541 to screw with the second hole 15 of the coupling seat 12, and the shaft 55 inserts through the second aperture 513 of the first connecting rod 51, the sixth aperture 533 of the third connecting rod 53, and an eighth aperture 542 of the fourth connecting rod 54 to axially connect the first, the second, and the third connecting rods 54 together.

The guiding loop 56 includes a slot 561 disposed on an inner wall thereof to receive the shank 515 of the first connecting rod 51, and includes a third bore 562 mounted on a bottom end thereof so that an eighth screw 563 inserts through the third bore 562.

When the speed shifting cable 35 is pulled or released, the cable rack 30 rotates and pushes the limiting stem 40, the connecting rod set 50, the assembling bracket 80, and the guide plate 90, and the connecting rod set 50 is actuated and limited by the slot 561 to move in a horizontally arcuate path, and the guide plate 90 displaces in a laterally arcuate path, thus shifting speed quickly and reliably. In addition, when a smaller chain wheel 95 is shifted to a larger chain wheel 95 adjacent to the smaller chain wheel 95, a chain 94 is guided to teeth 96 of the larger chain wheel 95 to shift speed smoothly, thereby preventing the chain 94 from interfering the teeth 96, preventing the chain 94 from disengaging from the teeth 96, and preventing the chain 94 from making noise because rubbing with the teeth 96.

While we have shown and described various embodiments in accordance with the present invention, it is clear to those skilled in the art that further embodiments may be made without departing from the scope of the present invention.

What is claimed is:

1. A front derailleur of a bicycle comprising:
    a retaining ring disposed on a bottom end of a seat post, the retaining ring including two coupling seats symmetrically fixed thereon to axially connect with a pushing mechanism, and the pushing mechanism being comprised of a cable rack, a limiting stem, a connecting rod set, a guiding loop, an axial pillar, an assembling bracket, and a guide plate, the coupling seat including the connecting rod set attached thereon, and the connecting rod set including a first connecting rod, a second connecting rod, a third connecting rod, and a fourth connecting rod, a shaft, and the guiding loop, characterized in that the coupling seat includes a first hole formed on a bottom end of a side thereof so that a first screw inserts through a first bore of the cable rack and a turning spring so that the cable rack and the turning spring screw with the first hole of the coupling seat by ways of the first screw, and includes two first tabs mounted on top ends thereof respectively to connected with the axial pillar axially;
    wherein the guide plate moves in a horizontally arcuate path to auxiliarily shift a chain between at least two chain wheels;
    wherein the coupling seat includes a second hole disposed on a middle section between two sides thereof, and the second hole includes two first defining pegs extending from one side thereof to limit the fourth connecting rod to move in a horizontally arcuate path when it is actuated;
    wherein and the axial pillar includes a second and a third tabs attached on two sides thereof individually, and the second and the third tabs includes a third and a fourth hole formed thereon individually to insert a ninth and a tenth screws to screw with the first tabs of the coupling seat respectively;

wherein a front segment of the turning spring retains with a boss of the coupling seat, and a distal segment of the returning spring is retained in the groove of the cable rack so that when the returning spring releases or pulls a speed shifting cable, the cable rack rotates to a positioning or a returning position to shift speed;

wherein includes the assembling bracket includes a wing piece disposed on a rear end thereof, and the wing piece includes a sixth tab to axially fix the limiting stem, and a ninth and a tenth apertures to axially fix the first and the second connecting rods respectively;

wherein includes the assembling bracket includes a wing piece disposed on a rear end thereof, and the wing piece includes a sixth tab to axially fix the limiting stem, and a ninth and a tenth apertures to axially fix the first and the second connecting rods respectively;

wherein the first connecting rod includes a first aperture fixed on a rear end thereof to insert a sixth screw to screw with the tenth aperture of the wing piece of the assembling bracket, and includes a retainer and a shank secured on a front end thereof;

wherein the second connecting rod includes a third aperture disposed on a front end thereof so that an eleventh screw inserts through the third aperture and a fifth aperture of the third connecting rod to screw with a fifth hole of the axial pillar, and includes a fourth aperture disposed on a rear end thereof so that a seventh screw inserts through the fourth aperture to screw with the ninth aperture of the wing piece of the assembling bracket;

wherein the third connecting rod includes the fifth aperture mounted on a front end thereof so that the eleventh screw inserts through the third aperture of the second connecting rod and the fifth aperture to screw with the fifth hole of the axial pillar, and includes a second defining peg fixed on a middle section thereof so that when the connecting rod set does not expand and expands toward a largest distance to be positioned, the second defining peg contacts with the retainer of the first connecting rod to limit the connecting rod set expands to displace in a horizontally arcuate path, and includes a sixth aperture arranged on a rear end thereof;

wherein the fourth connecting rod includes a seventh aperture disposed on a front end thereof so that the second screw inserts through the seventh aperture to screw with the second hole of the coupling seat, and the shaft inserts through the second aperture of the first connecting rod, the sixth aperture of the third connecting rod, and an eighth aperture of the fourth connecting rod to axially connect the first, the second, and the third connecting rods together;

wherein the guiding loop includes a slot disposed on an inner wall thereof to receive the shank of the first connecting rod, and includes a third bore mounted on a bottom end thereof so that an eighth screw inserts through the third bore.

2. The front derailleur of the bicycle as claimed in claim 1, wherein the cable rack includes the first bore disposed on a middle section thereof, a recess and a groove mounted on an inner wall thereof, and the recess includes the returning spring received therein.

3. The front derailleur of the bicycle as claimed in claim 1, wherein the cable rack includes an orifice secured on a bottom end thereof to inert a third screw to screw with the speed shifting cable.

4. The front derailleur of the bicycle as claimed in claim 1, wherein the cable rack includes a frame disposed on an outer rim of a top end thereof to assemble the speed shifting cable.

5. The front derailleur of the bicycle as claimed in claim 1, wherein the frame includes a fourth tab mounted on a left side thereof, the fourth tab includes an opening fixed thereon to insert a fourth screw to axially limit the limiting stem.

6. The front derailleur of the bicycle as claimed in claim 1, wherein the limiting stem includes a vent arranged on a distal side thereof, and includes a fifth tab attached on a front side thereof to axially connect with the assembling bracket.

7. The front derailleur of the bicycle as claimed in claim 1, wherein the assembling bracket includes a holder and a second bore formed on a front end thereof so that a twelfth screw inserts through the second bore to screw with a sixth hole of the guide plate.

* * * * *